United States Patent
Litvak et al.

(10) Patent No.: US 9,749,497 B2
(45) Date of Patent: Aug. 29, 2017

(54) APPARATUS AND METHOD USING A MASK PRODUCING A HALFTONE IMAGE WITH CENTROIDS OF CLUSTERS DISTRIBUTED STOCHASTICALLY AND BRIDGED-CLUSTER COMBINATIONS DEPENDING ON THRESHOLD LIGHTNESS LEVELS

(71) Applicant: LANDA CORPORATION LTD., Rehovot (IL)

(72) Inventors: Mattetyahu Litvak, Tel Aviv (IL); Shahar Klinger, Rehovot (IL); Alon Siman Tov, Or Yehuda (IL); Avraham Guttman, Yavne (IL)

(73) Assignee: LANDA CORPORATION LTD., Rehovot ( * ) Notice: Subject to any disclaimer, the term of this patent is extended or adjusted under 35 U.S.C. 154(b) by 0 days.

(21) Appl. No.: 15/109,635

(22) PCT Filed: Jan. 22, 2015

(86) PCT No.: PCT/IB2015/050501
§ 371 (c)(1),
(2) Date: Jul. 3, 2016

(87) PCT Pub. No.: WO2015/110988
PCT Pub. Date: Jul. 30, 2015

(65) Prior Publication Data
US 2016/0344896 A1 Nov. 24, 2016

(30) Foreign Application Priority Data
Jan. 22, 2014 (GB) .................................. 1401078.9

(51) Int. Cl.
*H04N 1/405* (2006.01)
*H04N 1/409* (2006.01)
*G06K 15/02* (2006.01)

(52) U.S. Cl.
CPC ....... *H04N 1/4055* (2013.01); *G06K 15/1876* (2013.01); *G06K 15/1881* (2013.01); *H04N 1/409* (2013.01); *H04N 1/4051* (2013.01)

(58) Field of Classification Search
CPC ........ H04N 1/405–1/4058; H04N 1/52; H04N 1/58; G06K 15/1876; G06K 15/1877; G06K 15/1881
See application file for complete search history.

(56) References Cited

U.S. PATENT DOCUMENTS 5,859,955 A * 1/1999 Wang ................... H04N 1/4055
358/1.9
6,128,099 A * 10/2000 Delabastita .......... H04N 1/4058
358/1.9

(Continued)

FOREIGN PATENT DOCUMENTS

| EP | 1111905 A2 | 6/2001 |
| EP | 1646222 A2 | 4/2006 |
| WO | WO02065755 A1 | 8/2002 |

OTHER PUBLICATIONS

Aurenhammer, Voronoi Diagrams—A survey of a Fundamental Geometric Data Structure, ACM Computing Surveys, vol. 23, No. 3, Sep. 1991, pp. 345-405.*

(Continued)

*Primary Examiner* — Scott A Rogers
(74) *Attorney, Agent, or Firm* — Marc Van Dyke; Fourth Dimension IP

(57) ABSTRACT

There is provided an ink-deposition device suitable for depositing ink on a target surface and a printing system comprising the same. In operation in a printing system, the (Continued)

Sub-threshold

Threshold ink-deposition device can convert digital images into ink images on the target surface using pixel-masks and methods as disclosed herein. Advantageously, the ink-deposition device, the printing system comprising it and the methods of using the same can reduce or prevent the occurrence of some undesired ink-formations typically governed by the respective physical and/or chemical properties of the surface and ink being used or mitigate their effect on print quality. Application of the pixel-image mask yields a binary image that exhibits pixel-clusters with stochastically distributed centroids.

20 Claims, 14 Drawing Sheets

(56) References Cited

U.S. PATENT DOCUMENTS

| | | | | |
|---|---|---|---|---|
| 6,724,501 | B2 * | 4/2004 | Atkins | H04N 1/4051 358/3.13 |
| 7,471,421 | B2 * | 12/2008 | Asai | H04N 1/4055 358/3.06 |
| 7,532,365 | B2 * | 5/2009 | Asai | H04N 1/4051 345/596 |
| 7,782,493 | B2 * | 8/2010 | Asai | H04N 1/4051 345/596 |
| 7,821,672 | B2 * | 10/2010 | Asai | H04N 1/4055 358/3.09 |
| 8,149,463 | B2 * | 4/2012 | Kawamura | H04N 1/405 358/1.9 |
| 8,149,464 | B2 * | 4/2012 | Kim | H04N 1/4055 358/3.06 |
| 8,441,688 | B2 * | 5/2013 | Kawamura | H04N 1/4051 358/1.9 |
| 8,848,254 | B2 * | 9/2014 | Hahm | H04N 1/4051 358/3.2 |
| 2002/0051147 | A1 * | 5/2002 | Asai | H04N 1/4055 358/1.9 |
| 2002/0163528 | A1 * | 11/2002 | Cooper | H04N 1/4055 345/596 |
| 2004/0252346 | A1 * | 12/2004 | Huang | H04N 1/4055 358/3.14 |
| 2005/0052468 | A1 | 3/2005 | Kroon | |
| 2006/0103883 | A1 * | 5/2006 | Damera-Venkata | H04N 1/4055 358/3.2 |
| 2007/0236738 | A1 * | 10/2007 | Hara | H04N 1/4051 358/3.02 |
| 2008/0239401 | A1 | 10/2008 | Stevens | |
| 2010/0290089 | A1 | 11/2010 | Stevens | |
| 2011/0157654 | A1 | 6/2011 | Wang et al. | |
| 2014/0226187 | A1 * | 8/2014 | Sagimori | G06K 15/1876 358/3.13 |

OTHER PUBLICATIONS

International Search Report for PCT/IB2015/050501 published as WO 2015/110988.
Written Opinion for PCT/IB2015/050501 published as WO 2015/110988.

* cited by examiner

FIG. 1 PRIOR-ART

PRIOR-ART

SECOND EXAMPLE OF "TOUCHING" PIXEL CLUSTERS
Cluster-derived ink formations
Part of Ink-image on target surface
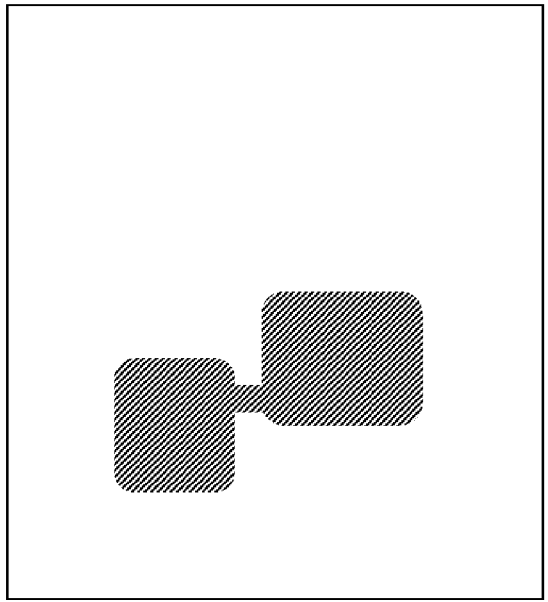
= Ink Formation
Ink-Image-Space Touching Pixel-Clusters –
Pixel Binary-Image
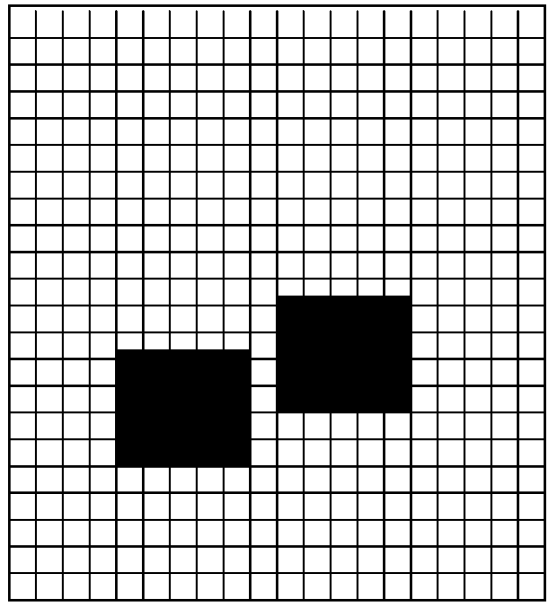
= pixels having a '1' value
= pixels having a '0' value
FIG. 5

Sub-threshold

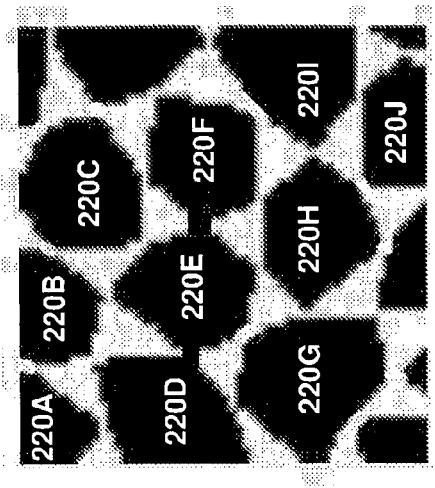
FIG. 8C Immediate successor
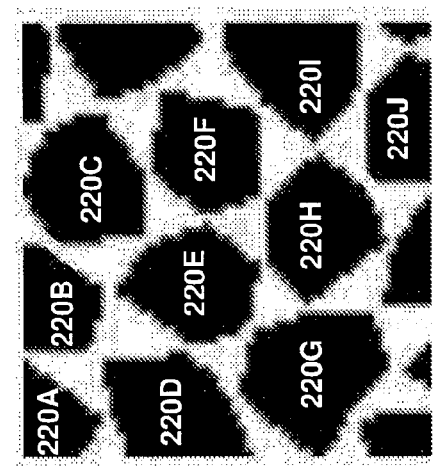
FIG. 8B Threshold
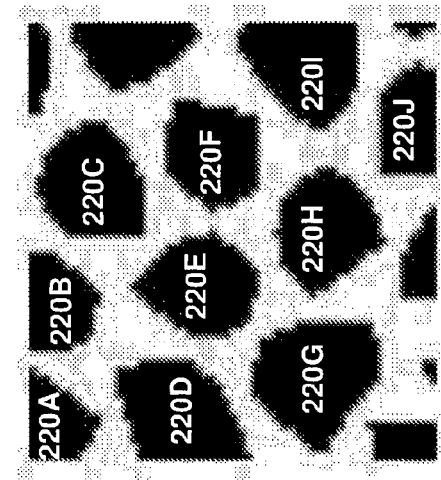
FIG. 8A Sub-threshold

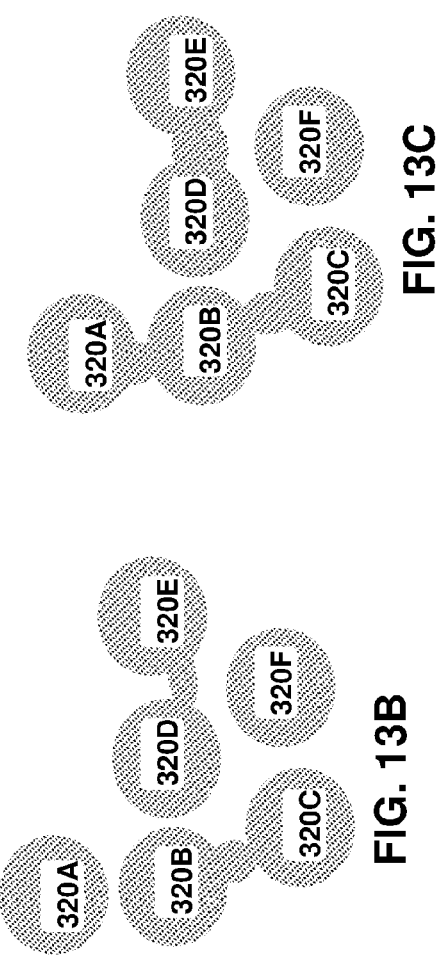
FIG. 13B
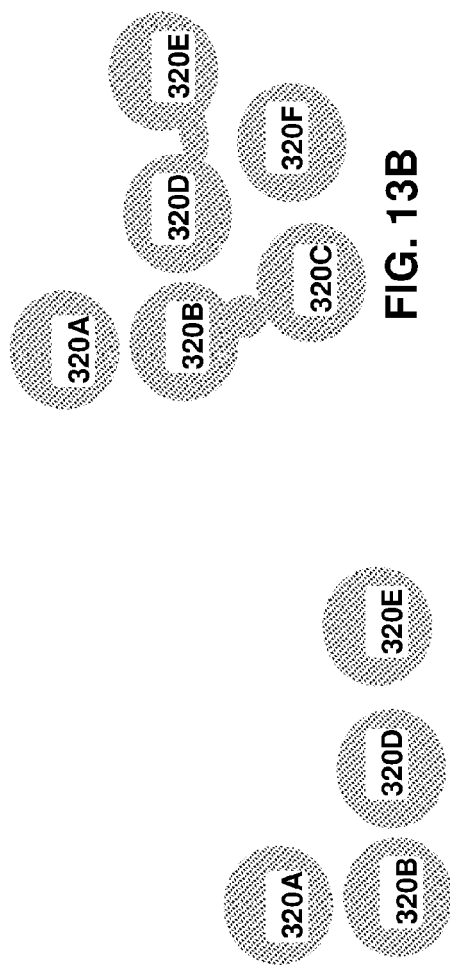
FIG. 13C
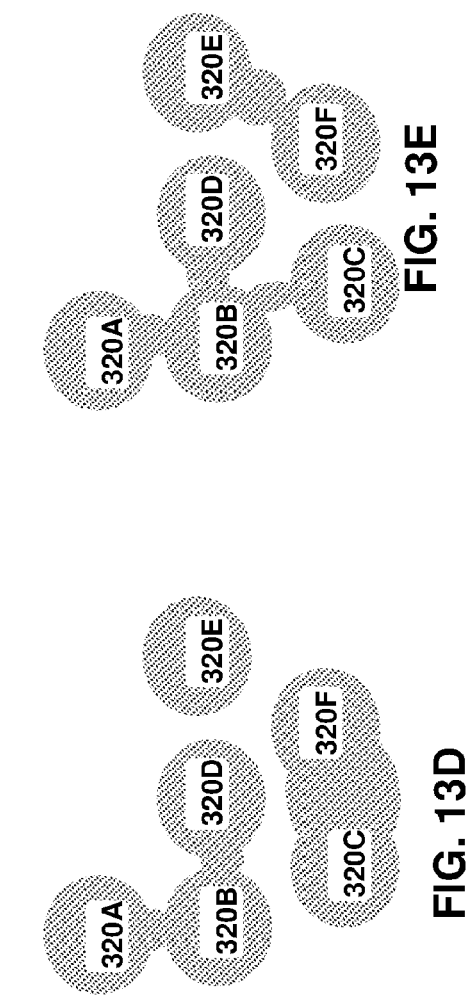
FIG. 13D
FIG. 13E
FIG. 13A

APPARATUS AND METHOD USING A MASK PRODUCING A HALFTONE IMAGE WITH CENTROIDS OF CLUSTERS DISTRIBUTED STOCHASTICALLY AND BRIDGED-CLUSTER COMBINATIONS DEPENDING ON THRESHOLD LIGHTNESS LEVELS

FIELD OF THE DISCLOSURE AND BACKGROUND ART

The present disclosure relates to the field of printing. In particular, the invention relates to an ink-deposition device suitable for depositing ink on a target surface by conversion of digital images into ink images, to a printing system comprising the device, and to methods of using the same.

Digital Printing

Digital printing techniques have been developed that allow a printer to receive instructions directly from a computer without the need to prepare printing plates as in traditional offset printing. Such processes broadly fall into two categories: direct printing, in which the ink is directly deposited on the final printing substrate (e.g. sheets or webs of fibrous or non-fibrous materials as paper, cardboard, plastic, etc.), and indirect printing, in which the ink is first deposited on an intermediate transfer member and therefrom to the final printing substrate.

Inkjet and bubble jet printers, which are commonly used in home and office settings, are examples of direct printing systems. In these processes droplets of ink are sprayed onto a final substrate in an image pattern. In general, the resolution of such processes is limited due to wicking by the inks into porous paper substrates or other fibrous material. To reduce this phenomenon, fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications, especially for commercial printing. Furthermore, the use of coated substrates creates its own problems in that the surface of the substrate remains wet and additional costly and time consuming steps are needed to dry the ink, so that it is not later smeared as the substrate is being handled, for example stacked or wound into a roll. Furthermore, excessive wetting of the substrate causes cockling and makes printing on both sides of the substrate (also termed duplex printing) difficult, if not impossible.

Using an indirect printing technique overcomes many problems associated with inkjet printing directly onto the printing substrate. It allows the distance between the surface of the intermediate image transfer member and the inkjet print head to be maintained constant and reduces wetting of the final substrate, as the ink can be dried on the surface of the intermediate transfer member (ITM) before being applied to it, thus reducing or preventing bleeding of the ink image beneath the surface and into the structure of the printing substrate. Consequently, the final image quality of the ink film on the substrate is less affected by the physical properties of the substrate.

Aqueous based inks have a number of distinct advantages whether considered for direct or indirect printing systems. For the latter systems, silicone coated transfer members are generally preferred, since this facilitates transfer of the dried image to the final substrate. The respective chemical and/or physical properties of the ink and of the target surface it may interact with (e.g. an ITM or a printing substrate) are known to affect the resulting print quality. As noted above, the surface of the printing substrate may be treated (e.g. coated) to mitigate any undesired interaction between the ink and for instance the paper. Similarly, the surface of the intermediate transfer member may be treated or conditioned to improve its interaction with the ink.

Half-Toning

Half-toning is well-known in the art, in particular in the field of printing. Generally speaking, a digital image (e.g. a grayscale image) is first converted to a binary image, and the binary image is printed onto a target surface (e.g. of paper or another substrate), thereby converting the binary image into an ink-image.

FIG. 1 illustrates a prior-art technique for half-toning. In step S101, both (i) a 'target' multi-level digital image and (ii) a pixel-image mask, are stored in computer readable medium. Generally speaking, a computer readable medium may include storage media or memory media (i.e. volatile or non-volatile) such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

In step S105, the pixel-image mask is applied to the target multi-level digital image to yield the target binary image. Typically, this application is a mathematical transformation performed by electrical circuitry (e.g. of a digital computer).

In step S109, ink-droplets are deposited on the target surface according to the contents of the binary-image, thereby converting the target binary image into an ink-image. Referring to FIG. 2, it is noted that droplets are only deposited at locations on the surface that correspond to a respective location within the binary-image having a '1' value. However, once the ink is deposited on the surface, the deposited ink may behave so that the shape of the ink-image does not exactly match that of the binary-image. In the example of FIG. 2, two square-clusters of pixels are printed from the binary image—however, the corresponding ink image is somewhat 'distorted' and is not exactly square.

FIG. 3 illustrates a system for performing the method of FIG. 1. Within a computer storage (e.g. volatile or non-volatile computer memory) is stored the pixel-mask. A binary image is formed from an image according to the content of the pixel-mask. The binary-image is converted by an ink-deposition device into an ink-image on a target surface. The ink-formations deposited on the target surface make up the ink-image.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

The terms 'binary image' or 'digital image' or 'grayscale image' or 'multi-level image' all relate to computer data as opposed to an 'ink image' that relates to ink on a surface. A binary image is a digital image that has only two possible values for each pixel. Typically the two colors (or shades of a single color) used for a binary image are black and white though any two colors (or shades of a single color) can be used.

A 'binary' image is in contrast to a 'multi-level' image where each pixel can have one of three or more possible values—i.e. three or more color possibilities (i.e. colors or shades of a single color) per pixel.

For the case of a 'multi-level images,' the three (or more) colors used are typically grayscale though any three (or more) colors can be used. The term non-binary image also refers to the feature where each pixel can have one of three or more values—however, there is no requirement that the non-binary image actually contains all of the three- or more values just that the possibility exists. Thus, one example of a non-binary multi-level image is a uniform image where all pixels have a single value of the 3 or more values/levels describing colors or shades of a color.

A 'target image' is a digital image that is actually converted into an ink-image by printing the target image—i.e. by ink deposition. If the 'target image' is a non-binary or multi-level digital image, the target image is first converted into a 'target binary image' by applying a pixel-image mask thereto—this is half-toning.

Binary images comprising 'pixel clusters' within the binary image are known in the art—when the binary image is converted to an ink-image (i.e. by ink deposition on a surface), a plurality of 'cluster-derived' ink formations are produced on the surface where each 'cluster-derived' ink formation corresponds to a different respective pixel-cluster within the binary image.

Thus, amplitude modulation (AM) screening may be based upon printing binary images including periodic arrays of pixel clusters where the size of the pixel-cluster reflects the desired gray-level—i.e. at higher gray-levels, the clusters are larger. In contrast, frequency modulated (FM) screening place dots at non-regular distances to simulate a continuous tone image.

The term 'printing of a binary image' refers to the conversion of the binary image into an ink image by ink-deposition on the target surface of a printing system.

FIGS. 4-5 and 6A illustrate the printing of binary images. In all three examples, two pixel-clusters are present in the binary-image. In the example of FIG. 4, the pixel-clusters are 'touching'—i.e. the pixel-clusters are contiguous within the binary image, and the respective cluster-derived ink formations are also contiguous. In the example of FIG. 5, even though the pixel-clusters are separated and not contiguous within the binary image, the produced cluster-derived ink formation are, in fact, contiguous due to the physical and/or chemical properties of the ink and/or target surface of the printing system being considered.

For the present disclosure, when two pixel-clusters are 'touching' the corresponding pixel-derived ink-structures formed by ink-deposition on the surface are contiguous—thus, the 'touching' property (or lack of touching, or the nearly-touching property discussed below) is a function not only of the data of the binary image, but also of the properties of the ink deposition process by which ink-images are formed on the target surface. The ink deposition process may be defined inter alia by any one (or combination) of (i) the physical and/or chemical properties of the ink and/or of the target surface; (ii) the temperature or ambient humidity at which the process takes place (e.g. room-temperature or elevated one) and/or (iii) the droplet size (e.g. as defined by the nozzle and instructions thereto) or the droplet velocity at which droplets are deposited and/or (iv) the distance between the nozzle tip and the target surface and/or (v) the size of ink droplets or velocity thereof upon impact with the target surface and/or (vi) the relative velocity of the target surface with reference to the nozzles and/or (viii) the resolution (dpi) of the image and/or other features.

For some printing systems, the ambient temperature and/or humidity may only have at most a minor influence about the performance of the ink-deposition process.

Thus, an ink-deposition process may define a relation between the 'space' of binary digital images (i.e. to be printed) and ink-image 'space.'

In contrast to the examples of FIGS. 4-5, in the example of FIG. 2, the pixel-clusters are clearly 'not touching.' The left-hand side of FIG. 2 illustrates clusters in digital image space, and the right-hand site of FIG. 2 illustrates 'ink-image space.' Whether or not clusters are 'touching' or 'not touching' is defined by the resulting ink image in 'ink image space.'—i.e. as discussed in the previous paragraph, the resulting affect in 'ink-image space' is determined by combination of the pixel values of the binary image and the ink deposition process.

In the example of FIGS. 6A-6B, the pixel-clusters are 'nearly touching.' In order for two pixels to be 'nearly touching,' (i) they must not be 'touching'; and (ii) a ratio between the closest distance (see dist of FIG. 6B) of the respective pixel-derived ink structures must be at most one of (A) at most 0.5, or at most 0.4, or at most 0.3, or at most 0.2, or at most 0.1, or at most 0.05 times the square root of the area of the cluster-derived ink structure corresponding to the smaller pixel-cluster; and/or (B) at most 0.5, or at most 0.4, or at most 0.3, or at most 0.2, or at most 0.1, or at most 0.05 times the square root of the area of the cluster-derived ink structure corresponding to the larger pixel-cluster; and/or (C) dist is less than 25 micrometers, or less than 50 μm, or less than 75 μm, or less than 100 μm, or less than 150 μm, or less than 200 μm.

It is noted that in FIGS. 5 and 6A, the pixel binary images are identical. However, because the ink-deposition process differs in FIGS. 5 and 6A, the pixel-cluster are considered 'touching' in ink-image-space in FIG. 5, and 'not touching' in FIG. 6A.

For the present disclosure, a 'pixel cluster' comprises one or more pixels.

The terms 'ink-formation(s)' and 'ink-structure(s)', which relate to elements of an ink image on a surface of a printing target, are used interchangeably.

The terms gray level, tone value and lightness are used interchangeably.

A uniform gray level image is an image for which all the pixels have an identical lightness value and the values for the a and b color dimensions in the Lab color space is zero.

The following patent publications provide potentially relevant background material, and are all incorporated by reference in their entirety: US 2010/290089, US 2008/239401, US 2011/157654 and US 2005/052468.

SUMMARY OF EMBODIMENTS

There is disclosed a method of digital printing which comprises: a. electronically applying an N×M pixel-image mask to a target non-binary multi-level digital image to obtain therefrom a target binary digital image; and b. converting the target binary digital image into an ink image by ink deposition onto a target surface, wherein variables L, M, N, r, s, p, y are defined such that L is a positive integer equal to at least 64, M and N are each positive integers that are each equal to at least 16, s is a positive integer having a value between 1 and y*L, p is a positive number having a value of at least 30, y is a positive number having a value of at most 0.1 at most 0.05 or at most 0.03, and r is a positive number having a value of at least 0.5, and wherein the N×M pixel-image mask has all of the following properties: i. a total number of lightness levels of the pixel-image mask is at least L; ii. at sub-threshold lightness levels below a threshold lightness level, application of the pixel-image mask to a uniform-lightness N×M digital image yields a sub-threshold-lightness-level binary image characterized by an array of pixel-clusters, centroids of clusters of the array being spatially distributed according to a stochastic pattern; iii. at the threshold lightness level, application of the pixel-image mask to a uniform-lightness N×M digital image yields a threshold-lightness-level binary image characterized by an array of pixel-clusters, centroids of clusters of the array being spatially distributed according to a stochastic pattern, the threshold-lightness-level binary image being further characterized such that, within ink-image-space defined according to the ink-deposition process of step (b), at least p % of all pixels-clusters of the array of pixel-clusters nearly touch a neighboring pixel-cluster without touching; iv. at a threshold-succeeding lightness level that is s lightness levels above the threshold lightness level (or alternatively between 1 and 10 or between 1 and 5 or between 1 and 3 lightness levels above the threshold lightness level), application of the pixel-image mask to a uniform-lightness N×M digital image yields a threshold-succeeding binary image characterized, within the ink-image-space, by a ratio r between (i) a number of 3+-bridged-cluster combinations and (ii) a number of 2-bridged-cluster combinations.

In some embodiments of the method of digital printing, a value of p is at least 40, or at least 50, or at least 60, or at least 70, or at least 80, or at least 90.

In some embodiments of the method of digital printing, a value of r is at least 0.6, or at least 0.7, or at least 0.8, or at least 0.9, or at least 1, or at least 1.25, or at least 1.5, or at least 2, or at least 3, or at least 5, or at least 7.5, or at least 10, or at least 20, or at least 50, or at least 100.

In some embodiments of the method of digital printing, a product of N and M is at least 250, or at least 500, or at least 1,000, or at least 2,000, or at least 5,000, or at least 10,000, or at least 100,000.

In some embodiments of the method of digital printing, at least a majority, or at least a substantial majority, or all of the pixel-clusters of the threshold-lightness-level binary image are of substantially the same size.

In some embodiments of the method of digital printing, the stochastic pattern is a blue-noise pattern.

In some embodiments of the method of digital printing, the target surface is a surface of an intermediate transfer member (ITM), the method further comprising transferring the ink-image from the surface of the ITM to a printing substrate.

In some embodiments, of the method of digital printing, the N×M pixel-image mask is defined so that the threshold-lightness-level binary image comprises at least 10 pixel-clusters, or at least 20 pixel-clusters, or at least 30 pixel-clusters, each of which have a size of at least 10 pixels, or at least 15 pixels, or at least 20 pixels.

In some embodiments of the method of digital printing, the N×M pixel-image mask is defined so that the threshold-lightness-level binary image comprises at least 10 pixel-clusters or at least 20 pixel-clusters.

In some embodiments of the method of digital printing, the ink is aqueous and/or the target surface is hydrophobic.

In some embodiments, of the method of digital printing, the ink substantially does not penetrate into the target surface.

A printing system for converting digital images into ink-images, the printing system comprising: a. an ink-deposition device capable of depositing ink on a target surface to form the ink-images thereon; b. an electronic controller for regulating the ink depositing by the ink-deposition device so that the printing system converts digital images into the ink-images according to a N×M pixel-mask such that wherein variables L, M, N, r, s, p, y are defined such that L is a positive integer equal to at least 64, M and N are each positive integers that are each equal to at least 16, s is a positive integer having a value between 1 and y*L, p is a positive number having a value of at least 30, y is a positive number having a value of at most 0.05, and r is a positive number having a value of at least 0.5, and wherein the N×M pixel-image mask has all of the following properties: i. a total number of lightness levels of the pixel-image mask is at least L; ii. at sub-threshold lightness levels below a threshold lightness level, application of the pixel-image mask to a uniform-lightness N×M digital image yields a sub-threshold-lightness-level binary image characterized by an array of pixel-clusters, centroids of clusters of the array being spatially distributed according to a stochastic pattern; iii. at the threshold lightness level, application of the pixel-image mask to a uniform-lightness N×M digital image yields a threshold-lightness-level binary image characterized by an array of pixel-clusters, centroids of clusters of the array being spatially distributed according to a stochastic pattern, the threshold-lightness-level binary image being further characterized such that, within an ink-image-space defined by the ink-deposition device, at least p % of all pixels-clusters of the array of pixel-clusters nearly touch without touching; iv. at a threshold-succeeding lightness level that is s lightness levels above the threshold lightness level, application of the pixel-image mask to a uniform-lightness N×M digital image yields a threshold-succeeding binary image characterized, within the ink-image-space, by a ratio r between (i) a number of 3+-bridged-cluster combinations and (ii) a number of 2-bridged-cluster combinations.

In some embodiments of the printing system, a product of N and M is at least 250, or at least 500, or at least 1,000, or at least 2,000, or at least 5,000, or at least 10,000, or at least 100,000.

In some embodiments of the printing system, a value of p is at least 40, or at least 50, or at least 60, or at least 70, or at least 80, or at least 90.

In some embodiments of the printing system, a value of r is at least 0.6, or at least 0.7, or at least 0.8, or at least 0.9, or at least 1, or at least 1.25, or at least 1.5, or at least 2, or at least 3, or at least 5, or at least 7.5, or at least 10, or at least 20, or at least 50, or at least 100.

In some embodiments of the printing system at least a majority, or at least a substantial majority, or all of the pixel-clusters of the threshold-lightness-level binary image are of substantially the same size.

In some embodiments of the printing system the stochastic pattern is a blue-noise pattern.

In some embodiments of the printing system the surface is an intermediate transfer member (ITM), the system further comprising an impression station configured to transfer the ink-images from the surface of the ITM to a printing substrate.

In some embodiments of the printing system the threshold-lightness-level binary image comprises at least 10 pixel-clusters, or at least 20 pixel-clusters, or at least 30 pixel-clusters, each of which have a size of at least 10 pixels, or at least 15 pixels, or at least 20 pixels.

In some embodiments of the printing system the threshold-lightness-level binary image comprises at least 10 pixel-clusters or at least 20 pixel-clusters.

In some embodiments of the printing system the ink is aqueous and/or the target surface is hydrophobic.

In some embodiments of the printing system the ink substantially does not penetrate into the surface.

According to one aspect, a printing system is disclosed. The printing system comprises: a). at least one of (i) a vessel suitable to store and/or transfer a volume of ink and (ii) a volume of ink; b). at least one of (i) a conveyor able to convey a target surface and (ii) a target surface; c). an ink-deposition device operative for converting digital images into ink images on the target surface by ink-deposition, according to a N×M pixel-mask (wherein N and M are integer ≥16), such that: i). a total number of lightness levels is at least L, L being a positive integer equal to at least 64; ii). at sub-threshold lightness levels below a threshold level, or at the threshold lightness level, application of the pixel-mask to a uniform-lightness N×M digital image yields a binary image characterized by an array of pixel-clusters, centroids of clusters of the array being spatially distributed according to a stochastic pattern; iii). at the threshold lightness level, the binary image is further characterized such that at least a majority, or at least a substantial majority, or substantially all neighboring pixels-clusters of the array nearly touch without touching; iv). at a threshold-succeeding lightness level that is s lightness levels above the threshold lightness level, s being a positive integer having a value of at most 0.2*L, or of at most 0.1*L, or of at most 10, or of at most 5, or of at most 3, or of exactly 1; application of the pixel-mask to a uniform-lightness N×M digital image yields a binary image that: A. comprises (I) a first bridge-pixel-group bridging a first and a second cluster of the array; and (II) a second bridge-pixel-group bridging said first cluster to a third cluster of the array; and B. is configured such that a ratio between 3+-cluster combinations to 2-cluster combinations exceeds 1, or exceeds 1.25, or exceeds 1.5, or exceeds 2, or exceeds 3, or exceeds 5, or exceeds 7.5, or exceeds 10, or exceeds 20, or exceeds 50, or exceeds 100.

In some embodiments of the printing system, a product of N and M is at least 250, or at least 500, or at least 1,000, or at least 2,000, or at least 5,000, or at least 10,000, or at least 100,000.

In some embodiments of the printing system, at least a majority, or at least a substantial majority, or all of the pixel-clusters are of substantially the same size.

In some embodiments of the printing system, the stochastic pattern is a blue-noise pattern.

In some embodiments of the printing system, the target surface is an intermediate transfer member (ITM), the system further comprising an impression station configured to transfer the ink-images from the surface of the ITM to a printing substrate. In such embodiments, the intermediate transfer member can be conveyed by one or more driving and/or guiding rollers. For instance, the ITM can be a blanket mounted on a drum or a blanket looped to form a continuous belt running over two or more rollers, at least one being a driving roller.

In some embodiments of the printing system, the target surface is a printing substrate.

In some embodiments of the printing system, at the threshold lightness level, the pixel-image mask comprises at least 10 pixel-clusters, or at least 20 pixel-clusters, or at least 30 pixel-clusters, each of which have a size of at least 10 pixels, or at least 15 pixels, or at least 20 pixels.

In some embodiments of the printing system, at the threshold lightness level, the pixel-image mask comprises at least 10 pixel-clusters or at least 20 pixel-clusters.

In some embodiments of the printing system, the ink is aqueous and/or the target surface is hydrophobic.

In some embodiments of the printing system, the ink substantially does not penetrate into the target surface.

An ink-deposition device is now disclosed. The ink-deposition device is capable of depositing ink on a target surface when in operation in a printing system, the ink-deposition device operative for converting digital images into ink images on the target surface by ink-deposition, according to a N×M pixel-mask (wherein N and M are integer ≥16), such that: i). a total number of lightness levels is at least L, L being a positive integer equal to at least 64; ii). at sub-threshold lightness levels below a threshold level, or at the threshold lightness level, application of the pixel-mask to a uniform-lightness N×M digital image yields a binary image characterized by an array of pixel-clusters, centroids of clusters of the array being spatially distributed according to a stochastic pattern; iii). at the threshold lightness level, the binary image is further characterized such that at least a majority, or at least a substantial majority, or substantially all neighboring pixels-clusters of the array nearly touch without touching; iv). at a threshold-succeeding lightness level that is s lightness levels above the threshold lightness level, s being a positive integer having a value of or at most 1*L, or at most 0.2*L, or at most 0.1*L, or of at most 10, or of at most 5, or of at most 3, or of exactly 1; application of the pixel-mask to a uniform-lightness N×M digital image yields a binary image that: A. comprises (I) a first bridge-pixel-group bridging a first and a second cluster of the array; and (II) a second bridge-pixel-group bridging said first cluster to a third cluster of the array; and B. is configured such that a ratio between 3+-cluster combinations to 2-cluster combinations exceeds 1, or exceeds 1.25, or exceeds 1.5, or exceeds 2, or exceeds 3, or exceeds 5, or exceeds 7.5, or exceeds 10, or exceeds 20, or exceeds 50, or exceeds 100.

In some embodiments of the ink deposition device, a product of N and M is at least 250, or at least 500, or at least 1,000, or at least 2,000, or at least 5,000, or at least 10,000, or at least 100,000.

In some embodiments of the ink deposition device, at least a majority, or at least a substantial majority, or all of the pixel-clusters are of substantially the same size.

In some embodiments of the ink deposition device, the stochastic pattern is a blue-noise pattern.

In some embodiments of the ink deposition device, at the threshold lightness level, the pixel-image mask comprises at least 10 pixel-clusters, or at least 20 pixel-clusters, or at least 30 pixel-clusters, each of which have a size of at least 10 pixels, or at least 15 pixels, or at least 20 pixels.

In some embodiments of the ink deposition device, the target surface upon which the device can deposit ink in operation in a printing system is an intermediate transfer member (ITM). In such embodiments, the intermediate transfer member can be conveyed by one or more driving and/or guiding rollers. For instance, the ITM can be a blanket mounted on a drum or a blanket looped to form a continuous belt running over two or more rollers, at least one being a driving roller.

In some embodiments of the ink deposition device, the target surface upon which the device can deposit ink in operation in a printing system is a printing substrate.

In some embodiments of the ink deposition device, the ink is aqueous and/or the target surface is hydrophobic.

In some embodiments of any of the afore-detailed ink-deposition device and printing system, when forming the ink-image, all droplets are of the same size. Alternatively, it is possible to employ 'multi-drop' jetting techniques to vary the effective individual drop size.

BRIEF DESCRIPTION OF THE DRAWINGS

The invention will now be described further, by way of example, with reference to the accompanying drawings, in which:

FIGS. 4-5 respectively illustrate first and second examples of touching pixel clusters.

FIGS. 8A-8C respectively illustrate examples of a sub-threshold-lightness-level binary image, a threshold-lightness-level binary image and a threshold-succeeding binary image.

FIGS. 13A-13E present examples of 3+-bridged-cluster combinations and 2-bridged-cluster combinations.

DETAILED DESCRIPTION OF EMBODIMENTS

Figure 1:
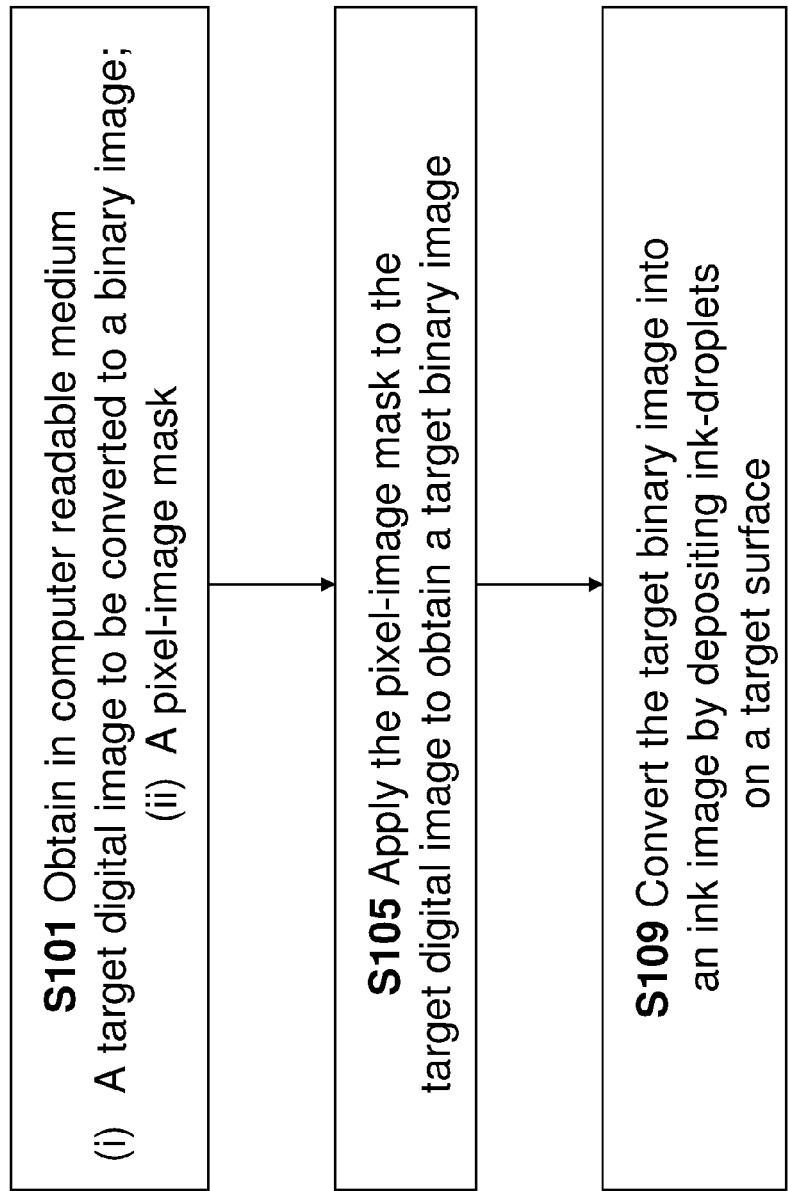
FIG. 1 is a flow-chart illustrating a prior-art technique for half-toning.
Figure 2:
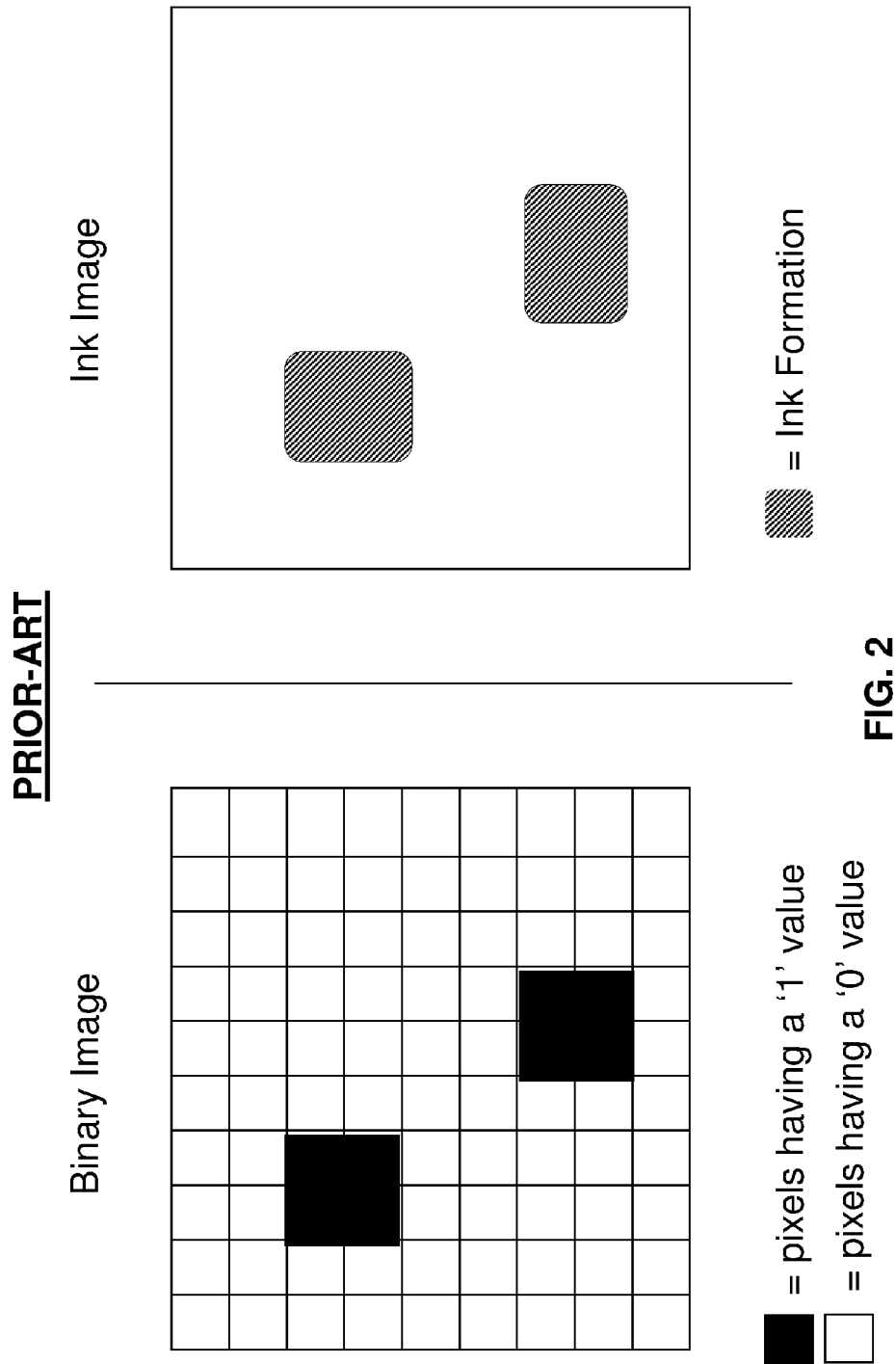
FIG. 2 illustrates a binary digital image comprising two square-clusters of pixels as well as an associated ink-image derived from the binary digital image.
Figure 3:
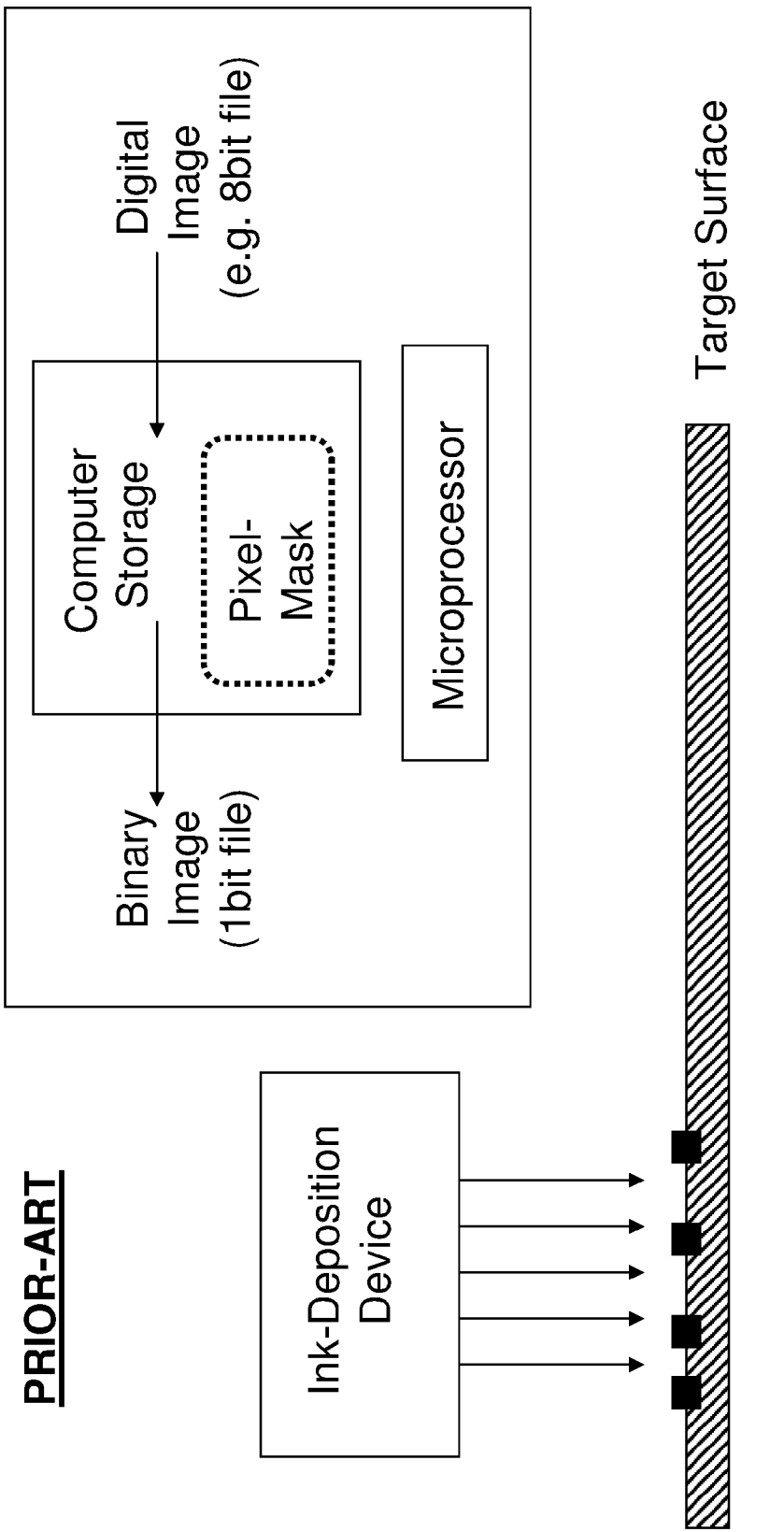
FIG. 3 illustrates a system for performing the method of FIG. 1.
Figure 4:
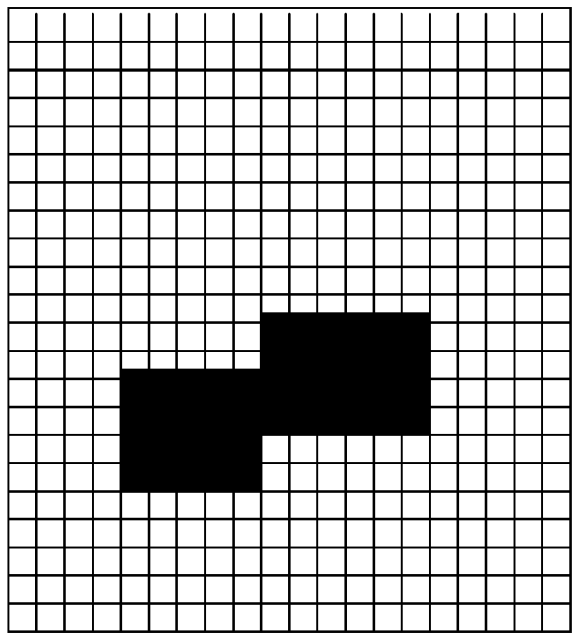
Figure 6A:
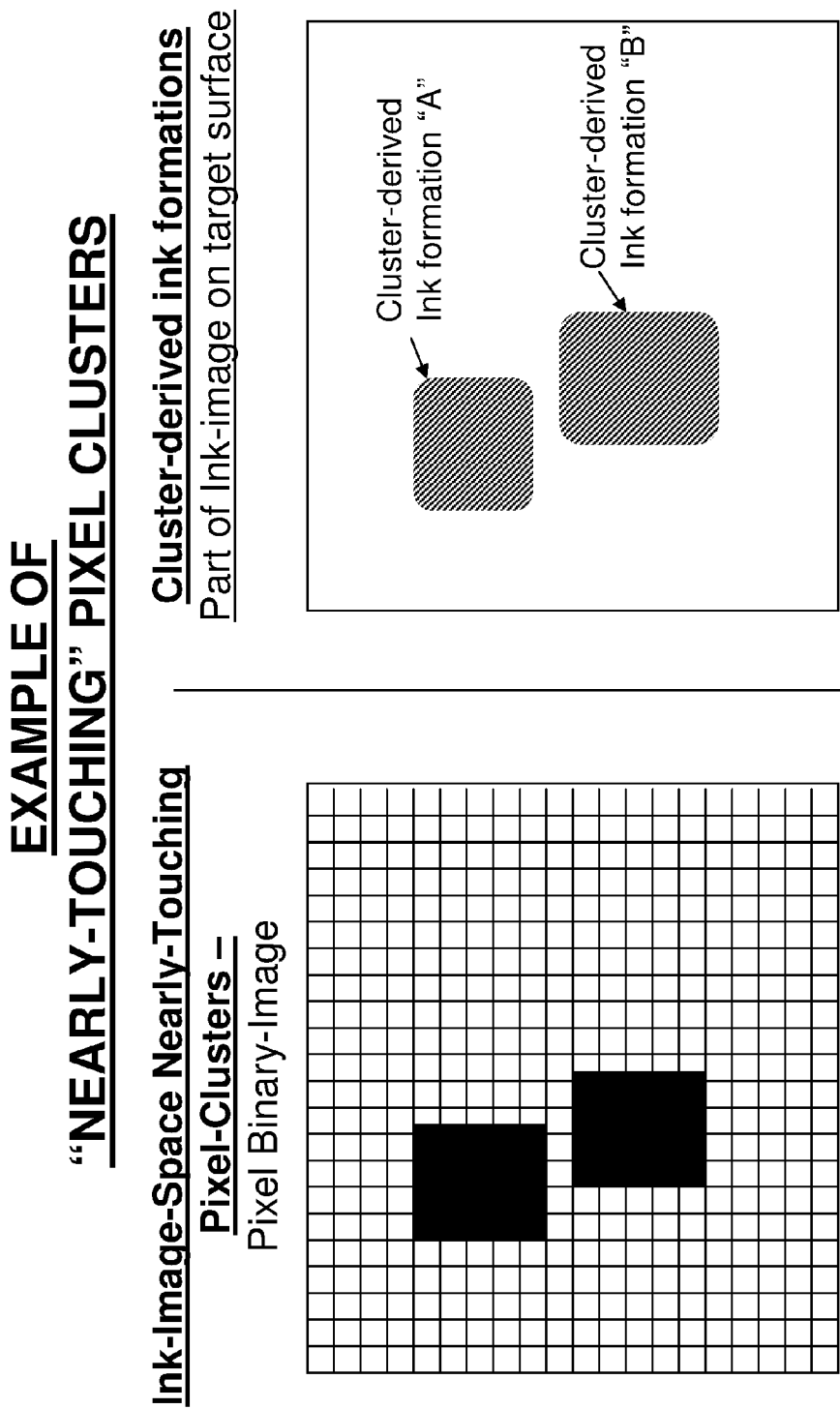
FIGS. 6A-6B illustrate examples of nearly-touching pixel clusters.
Figure 6B:
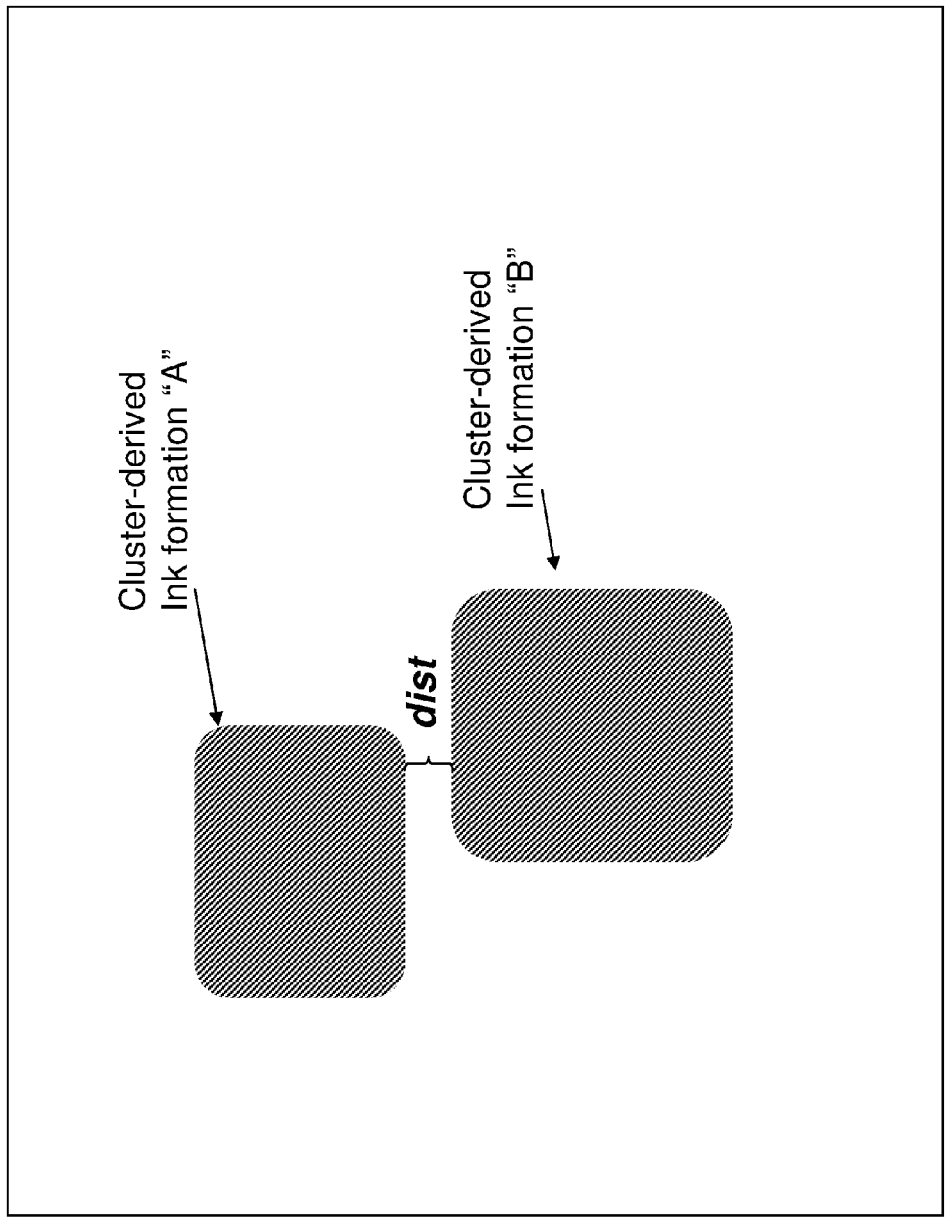

Embodiments of the present invention relate to ink deposition systems particularly suitable for printing systems where ink is deposited on a surface such that the geometry of the resulting ink-formations on the surface are governed, at least in part (for example, significantly), by the respective physical and/or chemical properties of the surface and ink being used. Typical such phenomena include beading of an ink droplet or formation of satellites and coalescence of separately deposited drops. Ink-formations having either smaller or greater area than intended by the binary image can degrade the print quality. Some embodiments of the present invention aim to mitigate the problems associated with prospective coalescence of ink on the target surface (e.g. as a result of surface tension). A fortiori in a digital image near touching clusters may contribute to undesired coalescence effects. Printing systems wherein aqueous ink droplets are deposited (e.g. jetted) onto a hydrophobic surface may, for example, be particularly demanding.

Not wishing to be bound by theory, it is noted that in such situations of perceptible loss of print quality, patches of substantially-uniform gray-level image may be prone to non-uniform ink coalescence that introduces 'graininess' or 'streakiness' into the image. In some embodiments, the presently-disclosed teachings may minimize this 'graininess' or 'streakiness.'

The present inventors are now disclosing (i) an apparatus and method for depositing ink on a target surface in accordance with a novel pixel-mask and (ii) a routine for generating a series of binary images that describe features of the pixel-mask. Not wishing to be bound by theory, some embodiments are particularly useful for situations where the ink-droplets tend to coalesce (e.g. into relatively 'large' formations) on the surface. For situations where a 'significant' image (i.e. at least 16×16 pixels, or at least 50×50 pixels, or at least 100×100 pixels, or at least 200×200 pixels, or at least 500×500 pixels, or at least 1000×1000 pixels) has a uniform gray-scale or pixels with uniform lightness values, the aforementioned ink-coalescence might cause non-uniformities in an ink image or patch thereof that is supposed to be uniform.

Towards this end, a technique is now disclosed whereby: (i) at relatively 'low' lightness values, a hybrid AM-FM printing technique is employed where multi-droplet ink-formations are disposed according to a stochastic pattern; (ii) at a 'threshold' lightness value, a mask is employed so that multi-cluster ink-formations (i.e. an ink formation derived from a plurality of pixel-clusters) tend to coalesce in a 'balanced manner' Thus, there is a preference for cluster-derived ink-formations to coalesce with two or more cluster-derived ink-formations, rather than with only a single cluster-derived ink-formation.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

If a value of an integer A is at most B, and B is a real number (but not an integer), then the value of A is at most equal to the value of the largest integer that is smaller B.

For the present disclosure 'electronic circuitry' is intended broadly to describe any combination of hardware, software and/or firmware. In some embodiments, a printing system includes an 'electronic controller' comprising 'electronic circuitry' and configured to regulate ink-deposition.

As was discussed above, a 'target digital image' is an image that is actually converted into an ink-image. In contrast, there are certain digital images which are described only so as to define features of the pixel-image mask by means of describing the result when the pixel-image mask is applied to a particular multi-level non-binary digital image.

Examples of digital images that are not 'target' digital images and are not required to be printed include sub-threshold-lightness-level binary image (see FIG. 7 and FIG. 8A), a threshold-lightness-level binary image (see FIG. 8B) and a threshold-succeeding binary image (see FIG. 8C).

The modifier 'sub-threshold-lightness-level' as applied to a 'binary image' is not intended to limit the content of the sub-threshold-lightness-level binary image—instead, this modifier is only used as a label to distinguish this sub-threshold-lightness-level binary image from other binary images. This label was selected because it relates to how sub-threshold-lightness-level binary image could hypothetically be formed by applying a pixel-image mask to a sub-threshold-lightness-level uniform digital image (i.e. multi-level image).

Similarly, the modifier 'threshold-lightness-level' as applied to a 'binary image' is not intended to limit the content of the threshold-lightness-level binary image—instead, this modifier is only used as a label to distinguish this threshold-lightness-level binary image from other binary images. This label was selected because it relates to how the threshold-lightness-level binary image could hypothetically be formed by applying a pixel-image mask to a threshold-lightness-level uniform digital image (i.e. multi-level image).

Similarly, the modifier 'threshold-succeeding' as applied to a 'binary image' is also just a modifier to label a specific example of a binary image and to distinguish from other examples of a binary image.

As noted above, an ink-deposition process may define a relation between the 'space' of binary digital images (i.e. to be printed) and ink-image 'space.'

An ink-deposition device may also define this relation. When the ink-deposition device defines this relation, this is according to operation of the ink-deposition device using a suitable or standard operating conditions using suitable ink and forming the ink-image on a suitable target surface (e.g. in a manner where mergers between ink-image formations may be correctable by any teaching disclosed herein). In different embodiments, this may be performed according to the teachings of any of the following patent documents, each of which are incorporated herein by reference: WO 2013/132439; WO 2013/132432; WO 2013/132438; WO 2013/132339; WO 2013/132343; WO 2013/132345; and WO 2013/132340.

Embodiments of the invention are applicable to digital images in general (e.g. RGB images, CMYK images, etc.) and not just to gray-scale digital images. However, for simplicity, embodiments will be explained in terms of gray-scale—the skilled artisan will appreciate that the teachings disclosed herein are also applicable to any value for the a and b color dimensions in the Lab color space, not only images containing L*,0,0 pixel values.

In some embodiments, the number of lightness levels (e.g. gray levels in the specific case of gray-scale) is at least L (L is a positive integer, for example L≥10, or L≥20, or L≥32, or L≥50, or L≥64, or L≥100, or L≥128, or L≥150, or L≥256). Alternatively the number of lightness levels may correspond to the bit depth of the digital image, e.g. 2-bit, 4-bit, 8-bit, 16-bit, 24-bit, 32-bit, etc.

For the present disclosure, an image (e.g. a digital/pixel image or an 'ink-image') may refer to either an entire image or to a patch thereof.

In some embodiments, the ink droplets deposited to form the ink-image on the target surface, whether having the same or different size, are jetted on a surface stationary relative to the ink-deposition device. Alternatively, the ink deposition device and the target surface can be in motion relatively to one another.

Embodiments of the present invention relate to a method of digital printing comprising the steps of: (a) electronically applying an N×M pixel-image mask MASK to a target non-binary multi-level digital image to obtain therefrom a target binary digital image; and (b) converting the target binary digital image into an ink image by ink deposition onto a target surface.

Properties of the presently disclosed image-mask MASK are discussed below.

Figure 9:
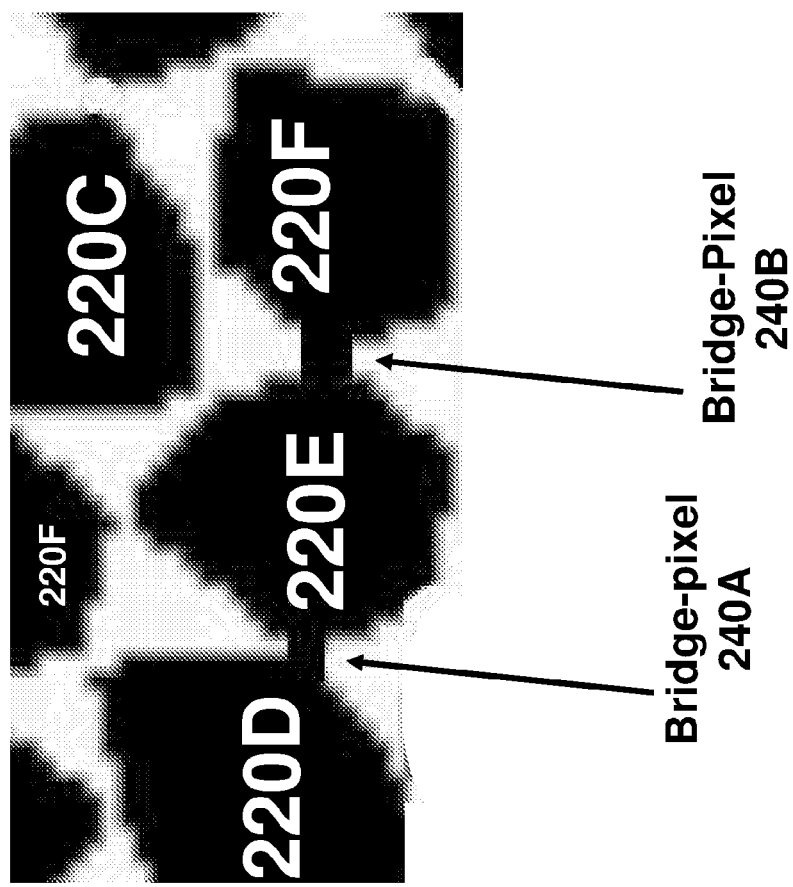
FIG. 9 is a magnification of FIG. 8C.

In particular, the presently-disclosed pixel image mask MASK is described in terms of the respective binary digital images obtained when the pixel-image mask is applied to a plurality of uniform pixel-images, each having a different respective uniform lightness level value. Three such images are (i) a sub-threshold-lightness-level binary image (one example is in FIG. 8A); (ii) a threshold-lightness-level binary image (one example is in FIG. 8B); and (iii) a threshold-succeeding binary image (one example is in FIGS. 8C and 9—FIG. 9 is a magnification of FIG. 8C).

Figure 7:
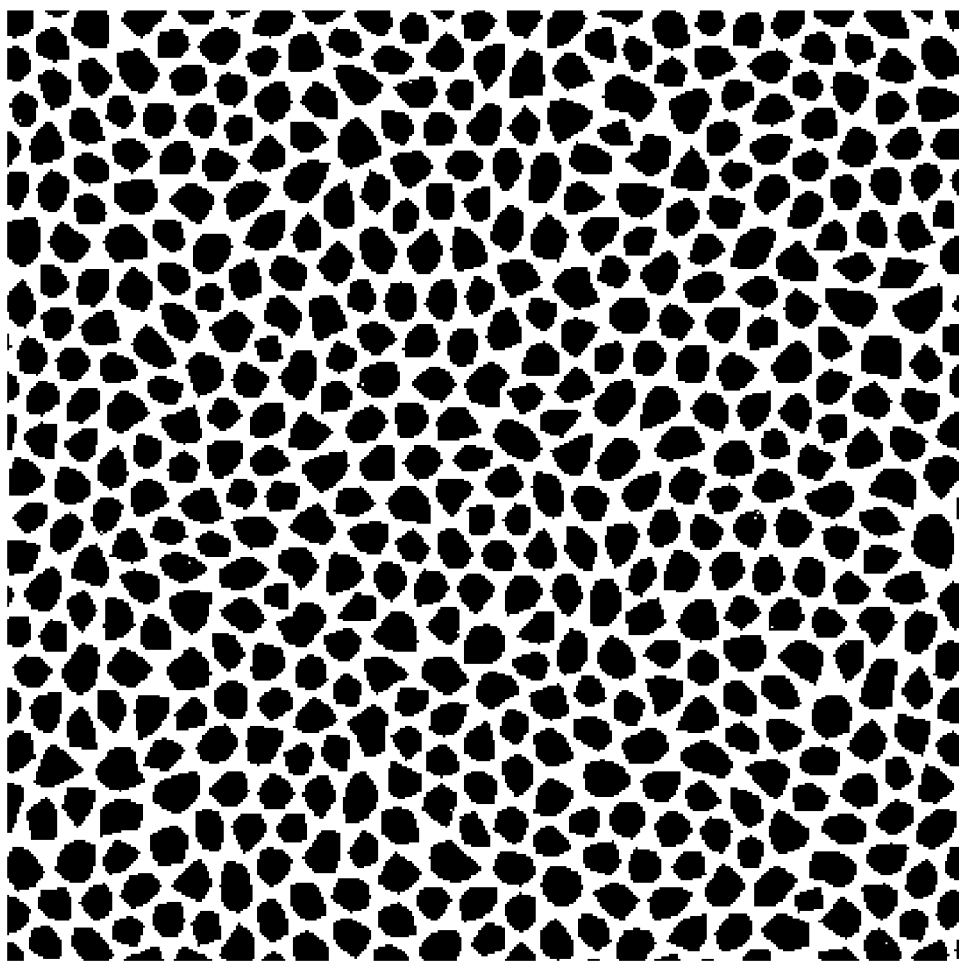
FIG. 7 illustrates an example of a sub-threshold-lightness-level binary image.

Sub-Threshold-Lightness-Level Binary Image:

When the presently-disclosed pixel-image mask MASK is applied to a relatively 'light' uniform pixel-image (i.e. having a relatively high lightness level value), the resulting binary image is characterized by a plurality of distinct pixel-clusters $\{PC_1, PC_2, \ldots PC_Q\}$ such that: (i) the centroids of the pixel clusters are defined as $\{centroid(PC_1), centroid(PC_2), \ldots centroid(PC_Q)\}$; (ii) these centroids are distributed according to a stochastic distribution scheme (e.g. a blue-noise scheme); (iii) the pixel clusters are distinct and do not 'touch' each other. As discussed above, the definition of 'touching,' nearly touching' and 'not touching' is relative to a specific ink-deposition process and thus is relative to the ink used and the properties of the target surface upon which it is deposited. Examples of binary sub-threshold-lightness-level digital images resulting from applying a pixel-image mask MASK to a uniform digital image of the relatively 'high' lightness value are illustrated in FIGS. 7 and 8A. Q, the number of pixel-clusters, is a positive integer that may be at least 10, or at least 20, or at least 30.

Threshold-Lightness-Level Binary Image:

When the presently-disclosed pixel-image mask MASK is applied to a uniform-image at a lower lightness level value than the relatively 'high' lightness values of the previous paragraph, the resulting binary image is characterized as follows: (i) the centroids $\{centroid(PC_1), centroid(PC_2), \ldots centroid(PC_Q)\}$ of the pixel-clusters are still distributed according to the stochastic distribution scheme (i.e. as was the case for the Sub-threshold-lightness-level binary image); and (ii) within an ink-image-space defined according to the ink-deposition process, at least some percentage p (e.g. at least 30%) of all pixel-clusters of the array nearly touch a neighboring pixel-cluster without touching. In different embodiments, a value of p is at least 30, or at least 40, or at least 50, or at least 60, or at least 70, or at least 80 or at least 90.

One heuristic example explaining how to compute a percentage p of pixel-clusters in an array of pixels that 'nearly touch' (i.e. in ink-image-space defined according to the ink-deposition process) a neighboring pixel-cluster is discussed below, with reference to FIG. 12.

Threshold-Succeeding Binary Image:

For the present disclosure, this 'lower' lightness value is referred to as 'nearly-touching threshold' value (or simply a 'threshold value'). In the present disclosure, nt_threshold is an abbreviation for 'nearly-touching threshold.' Assuming L lightness levels, nt_threshold is a positive integer less than L. When pixel-image mask MASK is applied to a uniform image having a lightness of nt_threshold, the resulting binary image is further characterized by the feature that the neighboring pixel-clusters nearly touch without touching. One example of such a binary image resulting from applying pixel-image mask MASK to a digital image having a uniform lightness value of nt_threshold is illustrated in FIG. 8B.

When the presently-disclosed pixel-image mask MASK is applied to a uniform-image at an even lower lightness level value than nt_threshold, a result such as that illustrated in FIG. 8C is obtained. The 'slightly lower lightness value' is nt_threshold−s, where s is a positive integer equal to or less than the number of lightness-levels L (e.g. equal to at most 0.2*L, or at most 0.1*L, or most 0.05*L, or at most 0.03*L). In some embodiments s is a positive integer of at most 10, or at most 5, or exactly equal to 1.

Thus, in FIG. 8B (illustrating one specific and non-limiting example of a 'threshold-lightness-level binary image'), all neighboring pixel-clusters are 'nearly-touching'—e.g. pixel-cluster 220B nearly touches pixel-cluster 220C. Pixel-cluster 220B does not nearly-touch pixel-cluster 220F—however, pixel-clusters 220B and 220F are not neighbors.

The illustrations of FIGS. 7 and 8A-8C are not images of the actual binary-images obtained by applying the mask MASK to uniform digital images (i.e. the data structure in computer memory), but rather the results (according to a computer-simulation) of what happens when the resulting binary image is printed using a particular ink and where the ink is deposited onto a particular target surface (e.g. a hydrophobic surface) using a particular type of ink (e.g. an aqueous ink). In some embodiments, the ink and/or surface may provide any feature or combination of features disclosed in any of the following published patent applications, each of which are incorporated herein by reference in its entirety: WO 2013/132439; WO 2013/132432; WO 2013/132438; WO 2013/132339; WO 2013/132343; WO 2013/132345; and WO 2013/132340.

Bridge-Pixel Groups and z-Bridged Cluster Combinations

In FIG. 8C, clusters 220D, 220E, and 220F are touching and are 'connected'. FIG. 9 is a close-up of FIG. 8C illustrating (i) a first bridge-pixel group 240A connecting pixel-cluster 220E with pixel-cluster 220D and (ii) a second bridge-pixel group 240B connecting pixel-cluster 220E with pixel-cluster 220F.

A 'bridge-pixel group' comprises one or more pixels—for example, at most 10, or at most 5, or at most 3 pixels—whose presence causes pixel-cluster derived ink formations to be connected in situations where, in the hypothetical absence of the 'bridge-pixel' group of pixels, the pixel-cluster derived ink formations would be 'not touching' and would be distinct, when printed.

For the present disclosure, for an integer z, a z-bridged-cluster combination is a cluster combination comprising exactly z members (i.e. comprised of z clusters). For the present disclosure, for an integer z, a z+-bridged-cluster combination is a cluster combination comprising at least z members (i.e. comprised of z or more clusters).

FIG. 8C includes a single 3-cluster combination (i.e. comprised of pixel-clusters 220D, 220E and 220F) and no 2-cluster combinations. Thus, in the example of FIG. 8C, a ratio r between the number of 3+-bridged-cluster combination and the number of 2-bridged cluster combinations is infinity, since there is exactly one of the former, and none of the latter—the ratio of 1/0 is either undefined or defined as infinity.

In some embodiments, the ratio between the number of 3+-bridged-cluster combinations to the number of 2-bridged-cluster combinations exceeds 0.5, or exceeds 0.6, or exceed 0.7, or exceeds 0.8, or exceeds 0.9, or exceeds 1, or exceeds 1.25, or exceeds 1.5, or exceeds 2, or exceeds 3, or exceeds 5, or exceeds 7.5, or exceeds 10, or exceeds 20, or exceeds 50, or exceeds 100.

Heuristic examples explaining how to compute a ratio r between (i) a number of 3+-bridged-cluster combinations and (ii) a number of 2-bridged-cluster combinations are discussed below with reference to FIGS. 13A-13E.

Two 'pixel-clusters' PCL_1 and PCL_2 are 'substantially the same size' if when printed to the surface to form corresponding ink structures, a ratio between an area of the larger corresponding structure to that of the smaller corresponding structure is at most 5, or at most 3, or at most 2.5, or at most 2, or at most 1.5, or at most 1.25.

A 'substantial majority' is at least 75%. Substantially all is at least 90%, or at least 95%. To summarize: (i) FIG. 8A illustrates the ink-image that would be formed (i.e. according to a defined printing, ink-deposition process) by printing a sub-threshold-lightness binary image to the target surface; (ii) FIG. 8B illustrates the ink-image that would be formed by printing a threshold-lightness binary image to the target surface; and (iii) FIGS. 8C and 9 illustrates the ink-image that would be formed by printing a threshold-succeeding binary image to the target surface.

Figure 10:
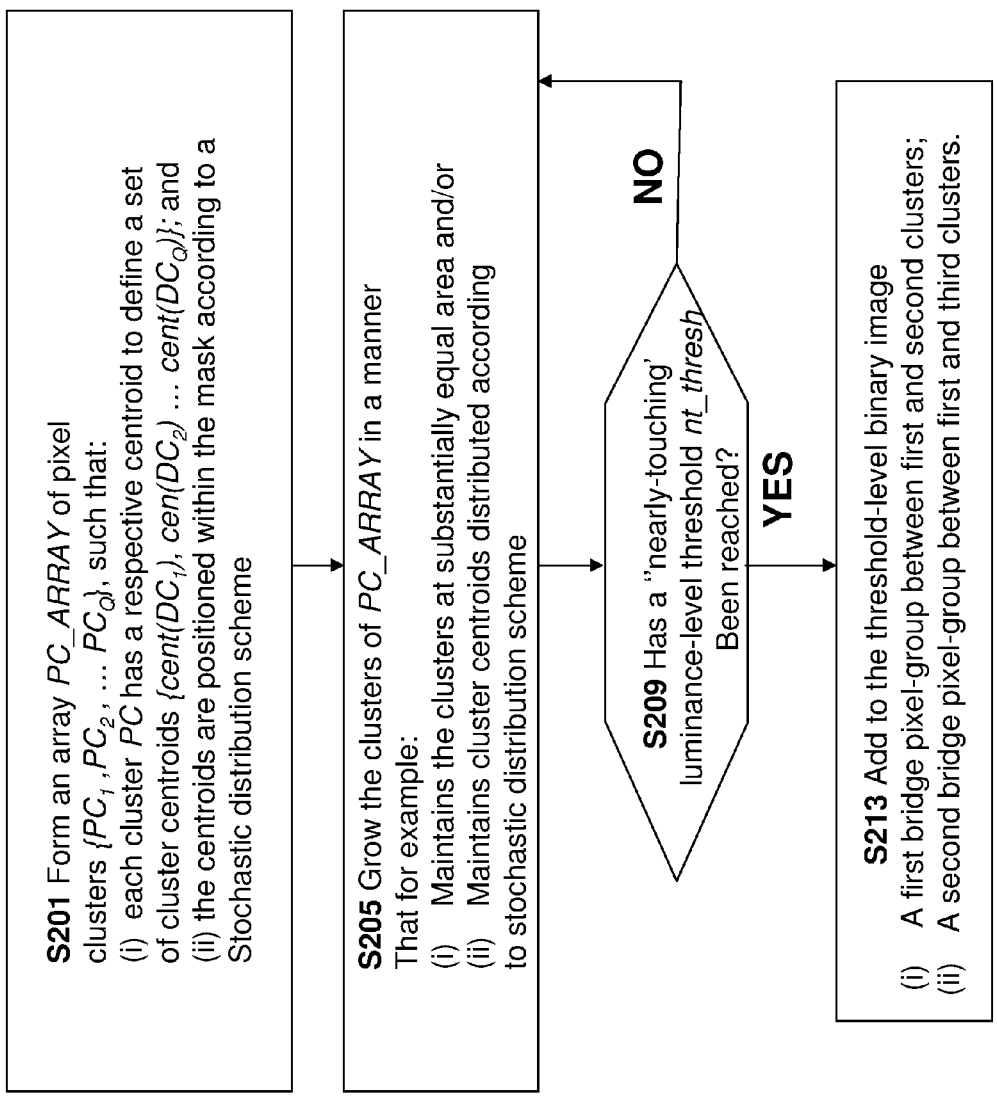
FIG. 10 is a flow chart for generating a series of binary images that each represents a respective result when the MASK is applied to digital images of different lightness levels.

FIG. 10 is a flow chart for generating a series of binary images that each represents a respective result when the MASK is applied to digital images of different lightness levels. The features of the binary images generated by FIG. 10 therefore describe properties of the pixel image-mask MASK.

FIG. 10 describes a routine for iteratively generating a series of binary images. In step S201, an initial binary image is generated. The first time step S205 is performed, a successor binary image is generated from the initial binary image generated in step S201. When step S205 is subsequently performed, a successor binary image is generated from the previous binary image generated during the previous execution of step S205.

Thus, in step S201, a binary image is generated to include a plurality of pixel-clusters $\{PC_1, PC_2, \ldots PC_Q\}$ such that: (i) the centroids of the pixel clusters are defined as $\{\text{centroid}(PC_1), \text{centroid}(PC_2), \ldots \text{centroid}(PC_Q)\}$; (ii) these centroids are distributed according to a stochastic distribution scheme (e.g. a blue-noise scheme).

Each time that step S205 is carried out, additional pixels are added to the previously-obtained binary image. The first time that step S205 is performed, additional pixels are added to the image of step S201—afterwards, additional pixels are added to the image obtained from the previous execution of step S205.

Each time step S025 is performed, the pixels are added in a manner that maintains the clusters at substantially equal area and/or maintains the cluster centroids distributed according to the stochastic distribution scheme.

In step S209, it is tested if the most recently generated binary image (i.e. at the highest-gray-level) is a threshold-lightness-level binary image—this would indicate if the threshold level is reached.

If so, then all previously-generated images (i.e. generated before the iteration of step S205 that yields a threshold-lightness-level binary image) are sub-threshold-lightness-level binary images.

Upon reaching the threshold level, the next binary image may be generated in step S213 from the most recent image of the last iteration of step S205—i.e. the 'threshold-level' binary image. In step S213, the image may be generated to obtain the result exemplified in FIGS. 8C and 9—i.e. first and second bridge pixel-groups are added to the threshold-level binary image.

In some embodiments, one salient feature of all sub-threshold-lightness-level binary images is that (i) all centroids have the substantially same location (i.e. within a small tolerance—e.g. at most 10%, or at most 5%, or at most 3%, or at most 1%, or at most 0.5% of the square root of a region of the surface where the binary-image is printed); and (ii) none of the pixel clusters of the mask MASK are 'touching'. This may also be true for a threshold-lightness-level binary image.

Figure 11:
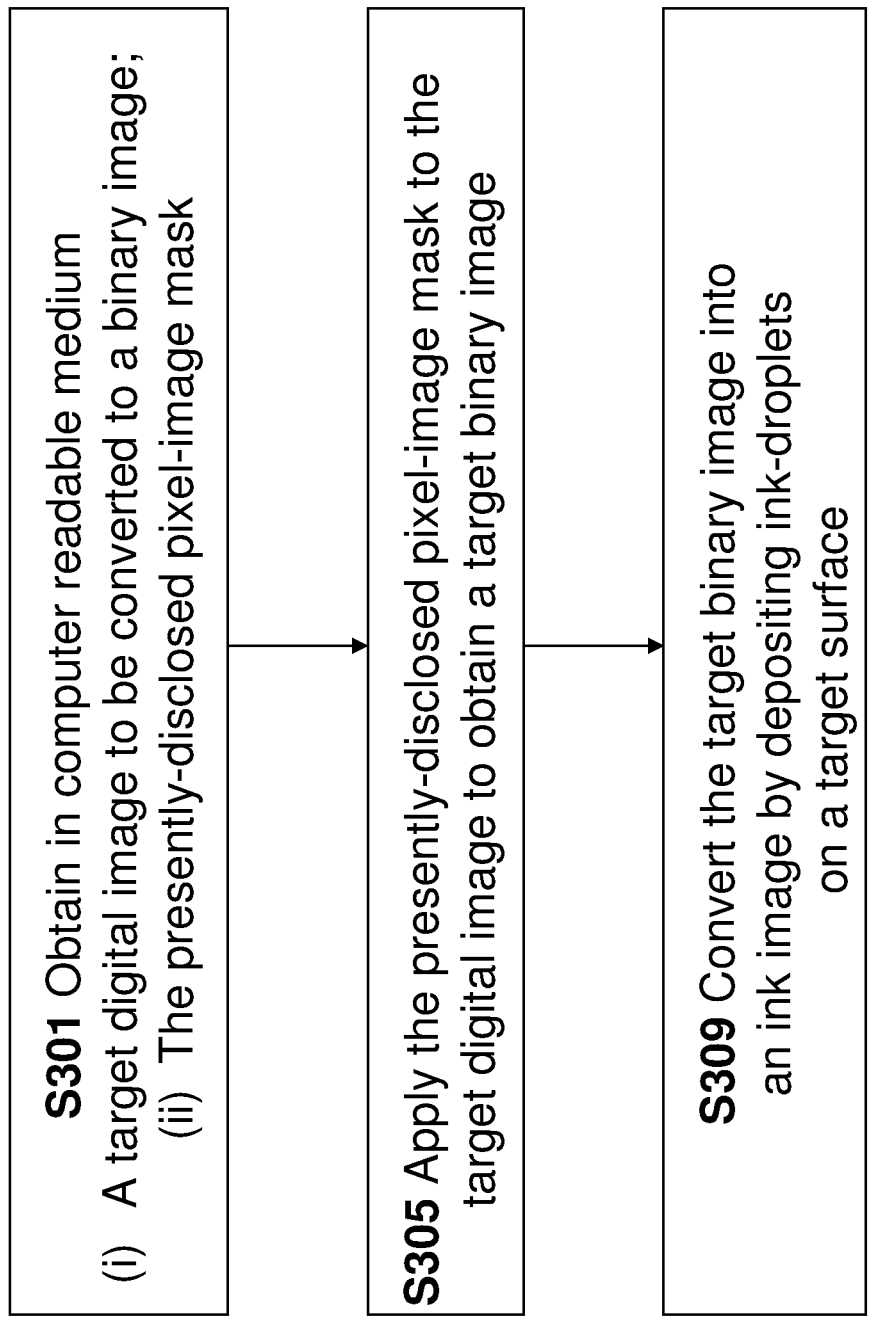
FIG. 11 is a flow-chart illustrating a technique for half-toning according to some embodiments of the invention.

Reference is now made to FIG. 11. Steps S301, S305 and S309 are respectively equivalent to step S101, S105 and S109 of FIG. 1—however, in the method of FIG. 11, the pixel-image mask is the presently-disclosed MASK.

Figure 12:
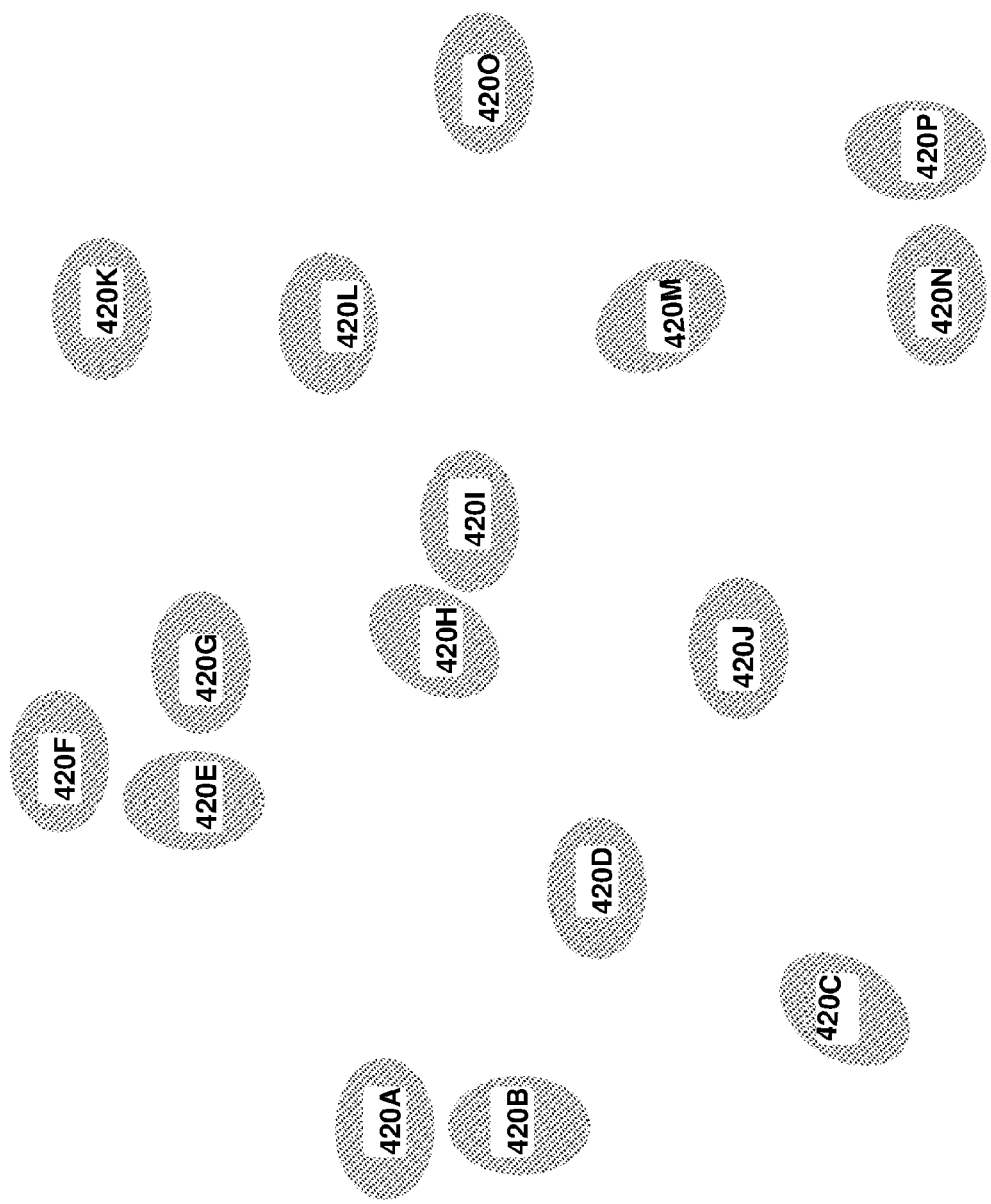
FIG. 12 presents one heuristic example explaining how to compute a percentage p of pixel-clusters that 'nearly touch' a neighboring pixel-cluster in an array of pixels.

Reference is Now Made to FIG. 12.

FIG. 12 presents one heuristic example explaining how to compute a percentage p of pixel-clusters that 'nearly touch' a neighboring pixel-cluster within an array of pixel-clusters (i.e. where the 'nearly touch' property is defined in ink-image-space defined according to an ink-deposition process).

Thus, in FIG. 12, pixel-clusters 420A and 420B nearly touch, pixel-clusters 420E and 420F nearly touch, pixel-clusters 420E and 420G nearly touch, pixel-clusters 420F and 420G nearly touch, pixel-clusters 420H and 420I nearly touch, and pixel-clusters 420N and 420P nearly touch.

The following pixel-clusters nearly touch a neighboring pixel-cluster without touching: 420A, 420B, 420E, 420F, 420G, 420H, 420I, 420N and 420P. Thus, a total of 9 pixel-clusters nearly touch a neighboring pixel-cluster without touching.

The following pixel-clusters do not nearly touch any other pixel-cluster: 420C, 420D, 420J, 420K, 420L, 420M and 420O. Thus, a total of 6 pixel-clusters nearly touch a neighboring pixel-cluster without touching.

Thus, in the example of FIG. 12, because the image has a total of 15 pixel-clusters, and because 9 of those pixel clusters nearly touch a neighboring pixel-cluster without touching, it may be said that 60% of all pixel-clusters of the array nearly touch a neighboring pixel-cluster without touching.

Reference is now made to FIGS. 13A-13E. Heuristic examples explaining how to compute a ratio r between (i) a number of 3+-bridged-cluster combinations and (ii) a number of 2-bridged-cluster combinations are now discussed with reference to FIGS. 13A-13E. In FIG. 13A, the clusters 320A-320E are all distinct and unconnected—there are no bridges between the clusters. Therefore, the example of FIG. 13A only includes individual clusters, and lacks bridged-cluster combinations.

In FIG. 13B, ink-image clusters 320B and 320C form a 2-bridged cluster. In addition, ink-image clusters 320D and 320E form a 2-bridged cluster—thus, there are two 2-bridged-cluster combinations and zero 3-bridged cluster combination.

In FIG. 13C, ink-image clusters 320A, 320B and 320C form a 3-bridged cluster. In addition, ink-image clusters 320D and 320E form a 2-bridged cluster. Thus, there is one 2-bridged-cluster combination and one 3-bridged cluster combination. Because a 3-bridged cluster combination is one example of a 3+-bridged cluster combination, in FIG. 13C there is one 2-bridged-cluster combination and one 3+-bridged cluster combination.

In FIG. 13D, former clusters 320C and 320F do not form a bridged cluster combination because they are now merged into each other—clusters 320C and 320F do not substantially retain their original shape (i.e. with only a 'bridge' as illustrated in the examples of FIGS. 13B-13C).

In FIG. 13E, ink-image clusters 320A, 320B, 320C and 320D form a 4-bridged cluster which is a specific example of a 3+-bridged cluster combination since 4>3. In addition, ink-image clusters 320D and 320E form a 2-bridged cluster. Thus, there is one 2-bridged-cluster combination and one 4-bridged cluster combination. Because a 4-bridged cluster combination is one example of a 3+-bridged cluster combination, in FIG. 13E there is one 2-bridged-cluster combination and one 3+-bridged cluster combination.

In some embodiments, an ink-deposition device includes and/or is controlled by 'electronic circuitry.'

Electronic circuitry may include any executable code module (i.e. stored on a computer-readable medium) and/or firmware and/or hardware element(s) including but not limited to field programmable logic array (FPLA) element (s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, 'comprise' 'include' and 'have', and conjugates thereof, are used to indicate that the object or objects of the verb are not necessarily a complete listing of members, components, elements or parts of the subject or subjects of the verb. As used herein, the singular form 'a', 'an' and 'the' include plural references unless the context clearly dictates otherwise.

What is claimed is:

1. A method of digital printing comprising:
   a. electronically applying an N×M pixel-image mask to a target non-binary multi-level digital image to obtain therefrom a target binary digital image; and
   b. converting the target binary digital image into an ink image by ink deposition onto a target surface, wherein variables L, M, N, r, s, p, y are defined such that L is a positive integer equal to at least 64, M and N are each positive integers that are each equal to at least 16, s is a positive integer having a value between 1 and y*L, p is a positive number having a value of at least 30, y is a positive number having a value of at most 0.05, and r is a positive number having a value of at least 0.5, and wherein the N×M pixel-image mask has all of the following properties:
      i. a total number of lightness levels of the pixel-image mask is at least L;
      ii. at sub-threshold lightness levels below a threshold lightness level, application of the pixel-image mask to a uniform-lightness N×M digital image yields a sub-threshold-lightness-level binary image characterized by an array of pixel-clusters, centroids of clusters of the array being spatially distributed according to a stochastic pattern;

iii. at the threshold lightness level, application of the pixel-image mask to a uniform-lightness N×M digital image yields a threshold-lightness-level binary image characterized by an array of pixel-clusters, centroids of clusters of the array being spatially distributed according to a stochastic pattern, the threshold-lightness-level binary image being further characterized such that, within an ink-image-space defined according to the ink-deposition process of step (b), at least p % of all pixels-clusters of the array of pixel-clusters nearly touch a neighboring pixel-cluster without touching;

iv. at a threshold-succeeding lightness level that is s lightness levels above the threshold lightness level, application of the pixel-image mask to a uniform-lightness N×M digital image yields a threshold-succeeding binary image characterized, within the ink-image-space, by a ratio r between (i) a number of 3+-bridged-cluster combinations and (ii) a number of 2-bridged-cluster combinations.

2. The method of claim 1, wherein a value of p is at least 40.

3. The method of claim 1, wherein a value of r is at least 0.6.

4. The method of claim 1, wherein a product of N and M is at least 250.

5. The method of claim 1, wherein at least a majority, or at least a substantial majority, or all of the pixel-clusters of the threshold-lightness-level binary image are of substantially the same size.

6. The method of claim 1, wherein the stochastic pattern is a blue-noise pattern.

7. The method of claim 1, wherein the target surface is a surface of an intermediate transfer member (ITM), the method further comprising transferring the ink-image from the surface of the ITM to a printing substrate.

8. The method of claim 1, wherein the N×M pixel-image mask is defined so that the threshold-lightness-level binary image comprises at least 10 pixel-clusters.

9. The method of claim 1, wherein the N×M pixel-image mask is defined so that the threshold-lightness-level binary image comprises at least 10 pixel-clusters.

10. The method of claim 1, wherein the ink is aqueous and/or the target surface is hydrophobic.

11. The method of claim 1, wherein the ink substantially does not penetrate into the target surface.

12. A printing system for converting digital images into ink-images, the printing system comprising:

a. an ink-deposition device capable of depositing ink on a target surface to form the ink-images thereon;

b. an electronic controller for regulating the ink depositing by the ink-deposition device so that the printing system converts digital images into the ink-images according to a N×M pixel-mask such that wherein variables L, M, N, r, s, p, y are defined such that L is a positive integer equal to at least 64, M and N are each positive integers that are each equal to at least 16, s is a positive integer having a value between 1 and y*L, p is a positive number having a value of at least 30, y is a positive number having a value of at most 0.05, and r is a positive number having a value of at least 0.5, and wherein the N×M pixel-image mask has all of the following properties:

i. a total number of lightness levels of the pixel-image mask is at least L;

ii. at sub-threshold lightness levels below a threshold lightness level, application of the pixel-image mask to a uniform-lightness N×M digital image yields a sub-threshold-lightness-level binary image characterized by an array of pixel-clusters, centroids of clusters of the array being spatially distributed according to a stochastic pattern;

iii. at the threshold lightness level, application of the pixel-image mask to a uniform-lightness N×M digital image yields a threshold-lightness-level binary image characterized by an array of pixel-clusters, centroids of clusters of the array being spatially distributed according to a stochastic pattern, the threshold-lightness-level binary image being further characterized such that, within an ink-image-space defined by the ink-deposition device, at least p % of all pixels-clusters of the array of pixel-clusters nearly touch without touching;

iv. at a threshold-succeeding lightness level that is s lightness levels above the threshold lightness level, application of the pixel-image mask to a uniform-lightness N×M digital image yields a threshold-succeeding binary image characterized, within the ink-image-space, by a ratio r between (i) a number of 3+-bridged-cluster combinations and (ii) a number of 2-bridged-cluster combinations.

13. The system of claim 12, wherein a product of N and M is at least 250.

14. The system of claim 12, wherein at least a majority, or at least a substantial majority, or all of the pixel-clusters of the threshold-lightness-level binary image are of substantially the same size.

15. The system of claim 12, wherein the stochastic pattern is a blue-noise pattern.

16. The system of claim 12, wherein the surface is an intermediate transfer member (ITM), the system further comprising an impression station configured to transfer the ink-images from the surface of the ITM to a printing substrate.

17. The system of claim 12, wherein the threshold-lightness-level binary image comprises at least 10 pixel-clusters.

18. The system of claim 12, wherein the threshold-lightness-level binary image comprises at least 10 pixel-clusters or at least 20 pixel-clusters.

19. The system of claim 12, wherein the ink is aqueous and/or the target surface is hydrophobic.

20. The system of claim 12, wherein the ink substantially does not penetrate into the surface.

* * * * *